June 2, 1942.　　O. F. HALL ET AL　　2,284,961
AUTOMATIC VALVE
Filed Dec. 2, 1940
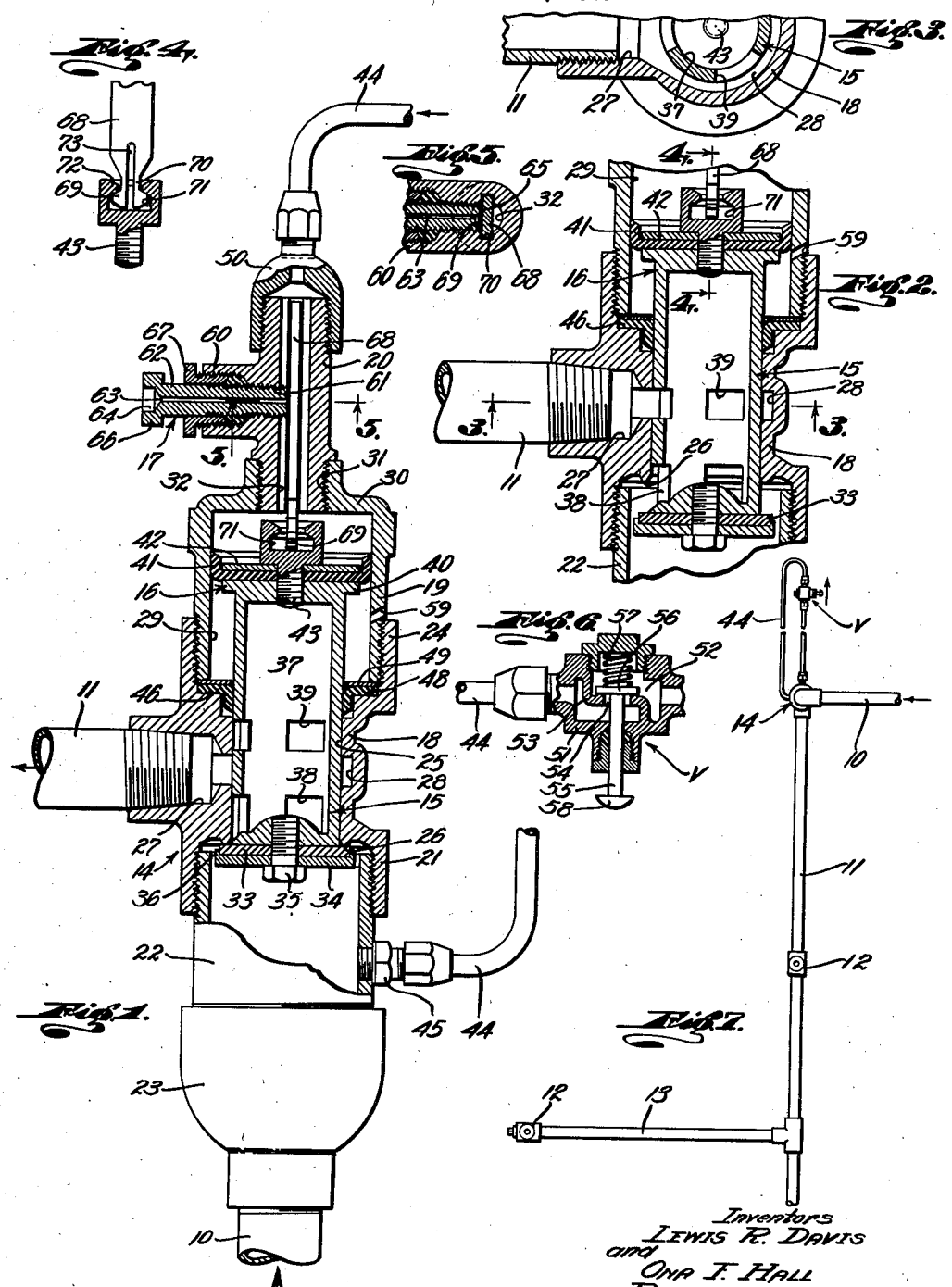
Inventors
LEWIS R. DAVIS
and
ONA F. HALL
By
Their Attorney Patented June 2, 1942

2,284,961

UNITED STATES PATENT OFFICE 2,284,961

AUTOMATIC VALVE

Ona F. Hall and Lewis R. Davis, Pico, Calif.; said Hall assignor to Ray T. Neeley, Pico, Calif.

Application December 2, 1940, Serial No. 368,210

10 Claims. (Cl. 137—139)

This invention relates to valves and relates more particularly to an automatic valve for controlling sprinkling systems, irrigation systems and the like. A general object of this invention is to provide a simple, inexpensive automatic control valve of the character mentioned that is positive and dependable in operation.

In watering or irrigating lawns, farm lands, etc., it is usually desirable to discharge the water during given periods and at intervals as necessary. It is the general practice to provide a sprinkling system, irrigation system, or the like with a manually operable control valve that must be manually opened at the beginning of the sprinkling or irrigating operation and that must be manually closed to shut off the water. The manually operable control valve requires that the operator be present to shut off the water at the correct time and in many instances the operator is delayed or is forgetful, with the result that there is over irrigation and a substantial loss of water.

Another object of this invention is to provide a control valve for a sprinkling system, irrigation system or the like that automatically closes or shuts off at a predetermined time after being opened.

Another object of this invention is to provide an automatic control valve that may be adjusted or regulated to remain open for any selected period of time.

Another object of this invention is to provide a control valve of the character mentioned that may be remotely controlled, that is, it may be opened by manipulation of a valve at a point remote from the control valve of the sprinkling system or irrigation system.

Another object of this invention is to provide a valve of the character mentioned in which the water pressure in the supply of the sprinkling system or irrigation system is utilized to effect closing of the valve under the control of a cylinder and piston means.

Another object of this invention is to provide an automatic valve of the character mentioned embodying novel and particularly dependable means for bleeding or discharging the water from the cylinder and piston control means at a uniform rate to assure the closing of the valve at the desired time.

A further object of this invention is to provide an automatic valve of the character mentioned in which the discharge for the cylinder and piston means cannot become clogged or excessively restricted by solid matter contained in the water. The improved discharge for the cylinder of the valve operating and controlling means embodies a part constantly moving past the orifice of the discharge in close proximity thereto throughout the period that the valve is open to control the rate of discharge of fluid from the cylinder and to prevent the entrance of large particles of solid matter into the orifice and to carry off accumulations of smaller particles of solid matter so that they do not restrict the water flow through the orifice.

The various objects and features of our invention will be fully understood from the following detailed description of a typical preferred form and application of the invention, throughout which description reference is made to the accompanying drawing, in which:

Fig. 1 is a longitudinal detailed sectional view of the valve of the present invention showing the parts in the closed position. Fig. 2 is a fragmentary longitudinal detailed sectional view of the main portion of the control valve with the parts in the open position. Fig. 3 is a fragmentary transverse detailed sectional view taken as indicated by line 3—3 on Fig. 2. Fig. 4 is a view of the connection between the piston and the discharge control part showing a portion of the screw in longitudinal cross section. Fig. 5 is a fragmentary transverse detailed sectional view taken as indicated by line 5—5 on Fig. 1. Fig. 6 is a longitudinal detailed sectional view of the remote control valve and Fig. 7 is a plan elevation of a typical sprinkling system embodying the control valve of the present invention.

The valve of the present invention may be employed to control fluid handling lines and systems of various natures. In the following detailed disclosure we will describe a typical preferred form of valve of the invention embodied in a simple sprinkling system to control the same. It is to be understood that the invention is not to be construed as limited or restricted to the specific form or application of the invention about to be described but is to be taken as including any features or modifications that may fall within the scope of the claims.

The irrigating system or sprinkling system illustrated in Fig. 7 of the drawing includes a supply pipe 10 which may be considered as handling water under a constant known pressure, from a city water supply, or the like. The system further includes a distributing pipe 11 provided with one or more outlets or sprinklers 12 and having one or more laterals 13 provided with sprinklers 12. The improved valve of the present invention controls communication between the supply pipe 10 and the distributing pipe 11 and therefore governs the delivery of the water to the sprinklers 12.

The automatic control valve of the invention comprises, generally, a body 14 connected between the supply pipe 10 and the distributing pipe 11, a valve 15 movable in the body 14 to control the passage of water therethrough, means 16 for operating the valve 15 and a regulable control 17 for the valve operating means 16.

The valve body 14 may be connected or interposed in the supply line 10 at any desired point or may be connected between the supply pipe 10 and the distributing pipe 11 as shown in the drawing. The body 14 is in the nature of a tubular or hollow structure for containing the valve 15, certain parts of the means 16, etc. In practice the body 14 is preferably sectional comprising a main section 18, a cylinder section 19 and an end section 20 on the cylinder section 19.

The main section 18 is provided at one end with means for facilitating its connection with the supply pipe 10. In the particular case illustrated the section 18 has an internally threaded boss or flange 21 receiving the threaded end of a nipple 22. A bell or reducer 23 connects the nipple 22 with the supply pipe 10. An internally threaded boss or flange 24 may be provided on the inner end of the main body section 18 to facilitate the connection of the sections 18 and 19. In accordance with the invention a central longitudinal opening 25 extends through the section 18 from one end to the other. The wall of the opening 25 is preferably finished or machined. An annular valve seat 26 is provided at the mouth or outer end of the opening 25. In the preferred structure illustrated the valve seat 26 is raised and projects outwardly or toward the interior of the nipple 22. A lateral outlet opening 27 is provided in the side of the main section 18 at a point substantially midway between the end of the section. The outer portion of the opening 27 may be threaded to receive the threaded end portion of the distributing pipe 11. A circumferential groove 28 is provided in the wall of the opening 25 and has extensive communication with the outlet opening 27.

The section 19 of the body 14 is the cylinder section of the valve, that is, it forms the cylinder of the means 16 as will be subsequently described. The inner end portion of the section 19 may be directly threaded in the end flange 24 of the body section 18. The opening 29 in the section 19 forms the cylinder opening of the means 16. In accordance with the invention the cylinder opening 29 is considerably larger in diameter than the opening 25. The cylinder section 19 has an outer end wall 30 provided with a central opening 31. The end section 20 of the body 10 is in the nature of an elongate tubular member whose inner end part is threaded in the opening 31. The longitudinal opening 32 in the tubular end section 20 is in communication with the outer end of the cylinder opening 29.

The valve 15 is provided to control communication between the nipple 22 of the supply pipe 10 and the outlet opening 27 which delivers the water to the distributing pipe 11. The valve 15 is an elongate member shiftable longitudinally in the opening 25. The outer end of the valve 15 carries a washer or valve disc 33 of rubber, leather, or the like for sealing against the seat 26. A metal washer 34 engages against the outer side of the valve disc 33 and a screw 35 extends through openings in the disc 33 and the washer 34 and is threaded in an opening in the valve 15 to clamp the washer inwardly against the valve disc 33 and to hold the disc against the end of the valve 15. The washer 34 is preferably provided with an axial peripheral flange 36 engaging the periphery of the valve disc 33 to prevent distortion and excessive wear of the disc.

The valve 15 is hollow, being provided with a longitudinal opening 37 that is closed at its opposite ends by integral end walls. A series of circumferentially spaced ports 38 is provided in the side wall of the hollow valve 15 to communicate with the opening 37. The ports 38 are adjacent what I will term the outer end of the valve 15 to communicate with the interior of the nipple 22 when the valve is open. A second series of circumferentially spaced ports 39 is provided in the side wall of the valve 15 to communicate with the groove 28 when the valve is in its open position. The ports 39 are out of communication with the groove 28 when the valve 15 is closed as shown in Fig. 1, so that the adjacent and surrounding wall portions of the body opening 25 close off the ports 39 from the groove 28 and the outlet opening 29. The valve 15 is shiftable from the closed position shown in Fig. 1 where it fully closes off communication between the nipple 22 and the pipe 11 to the open position shown in Fig. 2 where water may flow from the nipple 22 through the ports 38, the valve opening 37 and the ports 39 to the groove 28 and then from the discharge opening 27 to the distributing pipe 11.

The means 16 for operating the valve 15 is preferably, though not necessarily, a remotely controlled means. The means 16 is a cylinder and piston means comprising the cylinder body section 19 described above and a piston on the valve 15 operable in the cylinder opening 29. The piston may comprise an enlargement or radially projecting annular flange 40 on the inner end of the valve 15 and a cup leather 41 arranged against the flange 40 to slidably seal with the wall of the cylinder opening 29. A plate or washer 42 engages the outer side of the cup leather 41 and a screw 43 passes through openings in the washer 42 and the cup leather 41 and threads in an opening in the valve 15 to secure the washer and cup leather in place. It is important to note that the piston comprising the flange 40, the cup leather 41 and the washer 42 has a larger surface exposed to the action of the water under pressure in the cylinder opening 19 than the valve 15 has exposed to the action of the water under pressure in the nipple 22. Accordingly, the assembly of the valve 15 and the above described piston of the means 16 constitutes a differential plunger or piston having its small end subjected to the action of the water under pressure in the nipple 22 and having its large end subjected to the action of the water under pressure in the cylinder opening 29.

The invention preferably includes means sealing about the valve 15 to prevent the leakage of fluid or water between the opening 25 and the inner end of the cylinder opening 29. This means may comprise a cup leather 46 sealing about the valve 15 at the inner end of the section 19. The cup leather may be held or clamped between a shoulder 48 on the body section 18 and a washer 49 engaged by the inner end of the cylinder section 19.

The means 16 further includes a valved conduit 44 for admitting water under pressure from the supply pipe 10 or its nipple 22 to the cylinder opening 29 to open the valve 15. The conduit 44 has one end in communication with the water supply pipe 10. In the particular case illustrated in the drawing a suitable lateral fitting 45 connects one end of the conduit 44 with the interior of the nipple 22 of the supply pipe 10. The other end of the conduit 44 is connected with the section 20 to communicate with the outer portion of the opening 32. A suitable coupling 50 may connect the conduit 44 with the outer end of the section 20 and the opening 32 of the section 20 establishes communication between the conduit and the cylinder opening. In practice the bypass conduit 44 may be formed of copper tubing, or the like, and may be considerably smaller in capacity than the pipes 10 and 11.

The conduit 44 is controlled by a valve V. The valve V is a manually operable valve connected in the conduit 44. If desired the conduit 44 may extend to a point remote from the body 14 of the automatic control valve and the valve V may be connected in the conduit at such a remote point. For example, if the sprinkling system is employed to irrigate the lawn or garden of a residence the conduit 44 may extend to the residence and the valve V may be located to be conveniently accessible at the residence.

The valve V may be of any suitable type that normally closes the conduit 44 and that is manually operable to permit flow through the conduit to the cylinder opening 29. In the particular case illustrated in the drawing the valve V comprises a body 51 having a fluid passage 52 in communication with the adjacent sections of the conduit 44. A partition 53 extends across the passage 52 and has a fluid port 54. A stem 55 extends into the valve body 51 and passes through the port 54. A valve head 56 on the stem 55 is adapted to cooperate with a suitable seat on the partition 53 to close the port 54. A spring 57 normally holds the valve head 56 in its closed position. An operating head or button 58 is provided on the outer end of the stem 54 whereby the valve V may be opened by manually depressing the stem.

It will be apparent that when the button 58 is depressed fluid under pressure from the nipple 22 and the conduit 44 is admitted to the outer end of the cylinder opening 29. This fluid under pressure acts on the piston comprising the washer 42 and the cup leather 41 to shift the valve 15 to its open position. A bleeder port 59 is provided in the wall of the cylinder section 19 to communicate with the upper or inner portion of the cylinder opening 29 to permit the free discharge and entrance of fluid to and from this portion of the cylinder opening during movement of the valve 15.

The means 17 is an important feature of the invention. The means 15 effects the controlled discharge or escape of the fluid or water from the outer portion of the cylinder opening 29 under the action of the fluid under pressure in the nipple 22 acting on the valve 15. The means 17 may include a laterally projecting boss 60 on the end section 20 having an opening 61 extending inwardly to communicate with the opening 32. An orifice member 62 is threaded in the opening 61 to be adjustable therein and to have its inner portion projecting into the opening 32. An orifice 63 of small fluid capacity extends through the member 62 from one end to the other and a discharge socket 64 may be provided at the outer end of the orifice. The inner end 65 of the orifice member 62 is flat and parallel with the longitudinal axis of the opening 32. A knurled or polygonal head 66 is provided on the outer end of the orifice member 62 to facilitate its turning or manual adjustment. A packing gland 67 may be provided on the boss 60 to seal about the orifice member 62. The orifice 63 in the member 62 has its inner end in communication with the opening 32 so that fluid or water in the outer portion of the cylinder opening 29 may flow through the opening 32 and discharge or escape from the orifice 63.

The means 17 further includes a part 68 movable by or with the valve 15 to control the orifice 63. The part 68 is shiftable longitudinally in the opening 32 to reciprocate past the inner end of the orifice 63 during the opening and closing movements of the valve 15. In the preferred construction illustrated the part 68 is rectangular in transverse cross section having a broad flat face 69 parallel with and in close proximity to the inner end 65 of the orifice member 62. The part 68 is guided for longitudinal movement to remain in proper relation to the inner end 65 of the member 62. Diametrically opposite longitudinal grooves or guideways 70 are provided in the wall of the opening 32 and slidably or shiftably receive opposite edge portions of the part 68 to guide the part.

The orifice controlling part 68 is connected with the valve 15 to move therewith. In the particular case illustrated in the drawing the part 68 has a reduced neck 70 at its inner end carrying a head 69. A socket 71 is provided in the head of the screw 43 to receive the head 69 of the part 68. An inwardly projecting annular flange 72 having bevelled inner and outer faces is provided at the mouth of the socket 71. A longitudinal slot 73 enters the part 68 from the outer end of its head 69 to render the head and the neck 70 contractable and expansible. The head 69 has bevelled inner and outer faces adapted to cooperate with the bevelled faces of the flange 72. The head 69 may be sprung into the socket 71 by pressing the outer end of the head against the bevelled outer side of the flange 72 to compress or contract the head so that it may pass through the flange into the socket 71 where it expands. The head 69 is adapted to cooperate with the bottom or inner wall of the socket 71 and the flange 72 to connect the part 68 with the screw 43 on the valve 15.

The flat side or face 69 of the part 68 opposing the end 65 of the member 62 restricts or governs the entrance of the fluid or water to the orifice 63. By turning or threading the member 62 the relationship between the end 65 and the face 69 may be varied to regulate the discharge of fluid or water through the orifice 63 and thus provide for the movement of the valve 15 at any selected rate under the action of the fluid pressure in the nipple 22. The part 68 reciprocates past the inner end 65 of the stationary orifice member 62 during both opening and closing of the valve 15 and thus serves as a screen and wiper for the orifice 63, operating to wipe free any particles of solid matter that may tend to accumulate on the end 65 or that may tend to enter the orifice 63.

In operation the parts may normally be in the positions illustrated in Figs. 1 and 6 of the drawing where the automatic control valve and the manual valve V are closed. To open the automatic control valve to provide for the discharge of water from the sprinklers 12 the operator depresses the button 58 of the valve V. This opens the valve V to allow the water under pressure to flow through the conduit 44 to the outer end of the cylinder opening 29. This fluid or water under pressure acts against the washer 42 and the cup leather 41 to move the valve 15 to an open position such as illustrated in Fig. 3 of the drawing. The piston comprising the washer 42 and the cup leather 41 has a larger aggregate surface exposed to the action of the water under pressure than the aggregate surface of the valve 15 exposed to the action of the water under pressure in the nipple 22 so that the water under pressure admitted to the outer end of the cylinder opening 29 as just described opens the valve 15. In practice it is necessary to only momentarily depress the button 58 to effect opening of the valve 15. When the valve 15 is in its open position its ports 38 communicate with the interior of the nipple 22 and its ports 39 communicate with the groove 28 so that water under pressure from the supply pipe 10 is free to flow out through the opening 27 and the distributing pipe 11 to the sprinklers 12.

Immediately upon closing of the valve V following opening of the valve 15 liquid or water is trapped in the outer portion of the cylinder opening 29 and this trapped water resists closing of the valve 15 under the action of the water under pressure in the nipple 12 and the interior of the valve. The water trapped in the outer portion of the cylinder opening 29 is free to slowly leak or escape through the orifice 63 and its rate of escape depends upon the setting or adjustment of the orifice member 62. The member 62 may be adjusted to have its inner end 65 in very close relation to the face 69 to provide for a slow leakage or escape of water from the cylinder opening 29 or may be adjusted outwardly to provide for a more rapid escape of the water. The water in the outer portion of the cylinder opening 29 is maintained under pressure and is forced out by the action of the water under pressure acting on the valve 15 to close the valve.

As the water slowly leaks or escapes through the orifice 63 the valve 15 moves toward its closed position. The part 68 connected with the valve 15 is moved by the valve so that its face 69 moves past the end 65 and the inlet of the orifice 63. This constantly moving face 69 in close proximity to the end 65 and the entrance of the orifice 63 operates to clear or wipe free any particles of solid matter that may tend to gather on the end 64 or that may tend to enter the orifice 63. Thus the part 68 serves to restrict and therefore govern the entrance of water to the orifice 63 and serves to prevent clogging of the orifice by particles of solid matter that may be carried by the water. The orifice member 62 may be adjusted as described above to provide for the discharge of the water from the sprinklers 12 for any selected period. The orifice 63 controlled or governed by the moving control part 68 provides for the uniform rate of escape of water from the outer portion of the cylinder opening 29 and provides for a uniform closing movement of the valve 15. When the valve 15 reaches the closed position illustrated in Fig. 1 of the drawing the water is completely shut off from the distributing pipe 11 and the water under pressure in the nipple 22 serves to retain the valve 15 in its closed position until the valve V is again opened to provide for the discharge of the water from the sprinklers 12.

While we have herein described the automatic control valve of the invention handling water it is to be understood that it may be utilized to handle other fluids.

Having described only a typical preferred form and application of our invention, we do not wish to be limited or restricted to the specific details herein set forth, but wish to reserve to ourselves any variations or modifications that may appear to those skilled in the art or fall within the scope of the following claims.

Having described our invention, we claim:

1. A valve for controlling a line handling fluid under pressure comprising a body having a passage in communication with the line and having an outlet, a valve in the body for closing off the passage and urged to the closed position by the fluid pressure in the line, cylinder and piston means for opening the valve, means for supplying fluid under pressure to the cylinder and piston means to effect opening of the valve, an orifice member having a discharge orifice communicating with the cylinder of the cylinder and piston means whereby the fluid under pressure acting on the valve may force the fluid from the cylinder to effect closing of the valve, and means for controlling the orifice to govern the rate of closing of the valve comprising a part movable by the valve and extending past an end of the orifice, and screw thread means for adjusting the orifice member so that said end of the orifice may be moved toward and away from said part.

2. A valve for controlling flow from a pipe handling fluid under pressure comprising a body having an inlet in communication with the pipe, an outlet and a cylinder, a valve shiftable in the body and operable to close off communication between the inlet and the outlet, the valve being urged to the closed position by the fluid pressure in the pipe, a piston connected with the valve and operable in the cylinder, manually controlled means for supplying fluid pressure to the cylinder to open the valve, the body having an orifice communicating with the cylinder to allow the escape of fluid therefrom and thus allow closing of the valve, and means controlling the orifice comprising a part screening and restricting an end of the orifice and movable by the valve.

3. A valve for controlling flow from a pipe handling fluid under pressure comprising a body having an inlet in communication with the pipe, an outlet and a cylinder, a valve shiftable in the body and operable to close off communication between the inlet and the outlet, the valve being urged to the closed position by the fluid pressure in the pipe, a piston connected with the valve and operable in the cylinder, manually controlled means for supplying fluid pressure to the cylinder to open the valve, an orifice member on the body having an orifice communicating with the cylinder to allow the escape of fluid therefrom and thus allow closing of the valve, and means controlling the orifice comprising a part moved by the valve and having a surface movable past an end of the orifice.

4. A valve for controlling flow from a pipe handling fluid under pressure comprising a body having an inlet in communication with the pipe, an outlet and a cylinder, a valve shiftable in the body and operable to close off communication between the inlet and the outlet, the valve being urged to the closed position by the fluid pressure in the pipe, a piston connected with the valve and operable in the cylinder, manually controlled means for supplying fluid pressure to the cylinder to open the valve, a part moved by the valve, and an adjustable orifice member on the body having an orifice communicating with the cylinder to allow the escape of fluid therefrom and thus allow closing of the valve, an end of the orifice being in adjacent opposed relation to a surface of said part whereby the part controls and screens the orifice.

5. A valve for controlling flow from a pipe handling fluid under pressure comprising a body having an inlet in communication with the pipe, an outlet and a cylinder, a valve shiftable in the body and operable to close off communication between the inlet and the outlet, the valve being urged to the closed position by the fluid pressure in the pipe, a piston connected with the valve and operable in the cylinder, manually controlled means for supplying fluid presure to the cylinder to open the valve, a part in the cylinder connected with the valve to be moved thereby, and an orifice member threadedly connected with the body to extend into the cylinder and having an orifice for allowing the escape of fluid from the cylinder, the inner end of the orifice being in adjacent opposed relation to a face of the said part whereby the part serves to control and screen the orifice.

6. A valve for controlling flow from a pipe handling fluid under pressure comprising a body having an inlet in communication with the pipe, an outlet and a cylinder, a valve shiftable in the body and operable to close off communication between the inlet and the outlet, the valve being urged to the closed position by the fluid pressure in the pipe, a piston connected with the valve and operable in the cylinder, manually controlled means for supplying fluid pressure to the cylinder to open the valve, a part in the cylinder moved by the valve, a member on the body having an orifice for discharging fluid from the cylinder, the inlet of the orifice being adjacent a surface of said part to be controlled thereby, and means guiding the said part so that its said surface remains in a given relation to the inlet of the orifice.

7. A valve for controlling flow from a pipe handling fluid under pressure comprising a body having an inlet in communication with the pipe, an outlet and a cylinder, a valve shiftable in the body and operable to close off communication between the inlet and the outlet, the valve being urged to the closed position by the fluid pressure in the pipe, a piston connected with the valve and operable in the cylinder, manually controlled means for supplying fluid pressure to the cylinder to open the valve, a part in the cylinder moved by the valve, a member on the body having an orifice for discharging fluid from the cylinder, the inlet of the orifice being adjacent a surface of said part to be controlled thereby, and guideways guiding the said part so that its surface remains in a given relation to the inlet of the orifice.

8. A valve for controlling a pipe handling fluid under pressure comprising a body having an opening, an outlet for the opening and a cylinder opening, the first mentioned opening having an end communicating with the pipe, a valve shiftable in the said first-mentioned opening to control communication between the pipe and the outlet and exposed to the fluid pressure in the pipe to be urged to the closed position thereby, a piston on the valve operable in the cylinder opening, a valved conduit for conducting fluid under pressure from the pipe to the cylinder opening to act on the piston to open the valve, and regulable fluid escape means allowing the escape of the fluid from the cylinder opening whereby the valve may be caused to close at a selected rate, said fluid escape means comprising a part movable by the valve, a member having an orifice for bleeding fluid from the cylinder, the fluid receiving end of the orifice being adjacent and opposed to said part to be screened and restricted thereby, and screw threads on the body and member whereby the member may be adjusted to vary the spacing of said end of the orifice from said part.

9. A valve for controlling a pipe handling fluid under pressure comprising a body having an opening, an outlet for the opening and a cylinder opening, the first mentioned opening having an end communicating with the pipe, a valve shiftable in the said first mentioned opening to control communication to the fluid pressure in the pipe to be urged to the closed position thereby, a piston on the valve operable in the cylinder opening, a valved conduit for conducting fluid under pressure from the pipe to the cylinder opening to act on the piston to open the valve, and regulable fluid escape means allowing the escape of the fluid from the cylinder opening whereby the valve may be caused to close at a selected rate, the fluid escape means comprising an orifice member on the body having an orifice communicating with the cylinder opening, and a part in the body movable by the valve and having a surface in close proximity to the receiving end of the orifice to control and screen the same.

10. A valve for controlling a pipe handling fluid under pressure comprising a body having an opening, an outlet for the opening and a cylinder opening, the first mentioned opening having an end communicating with the pipe, a valve shiftable in the said first mentioned opening to control communication between the pipe and the outlet and exposed to the fluid pressure in the pipe to be urged to the closed position thereby, a piston on the valve operable in the cylinder opening, a valved conduit for conducting fluid under pressure from the pipe to the cylinder opening to act on the piston to open the valve, and regulable fluid escape means allowing the escape of the fluid from the cylinder opening whereby the valve may be caused to close at a selected rate, the fluid escape means comprising an orifice member on the body having an orifice communicating with the cylinder opening, a part in the body movable by the valve and having a surface in close proximity to the receiving end of the orifice to control and screen the same and means for adjusting the orifice member to vary the relationship between the receiving end of the orifice and said surface of the said part.

ONA F. HALL.
LEWIS R. DAVIS.